W. I. GOSSETT & J. P. STARK.
PLOW.
No. 177,503. Patented May 16, 1876.
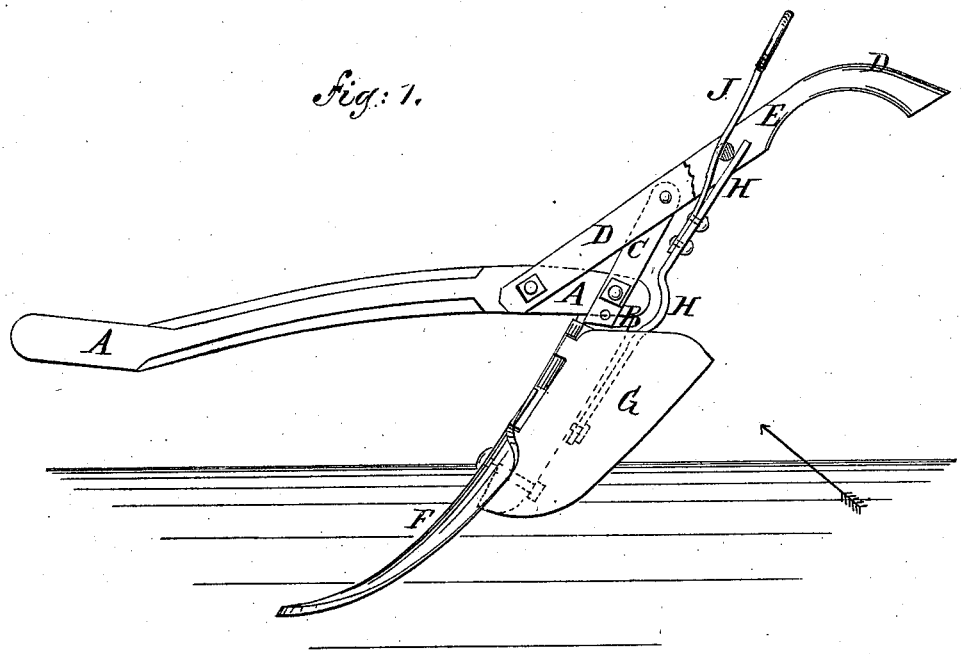
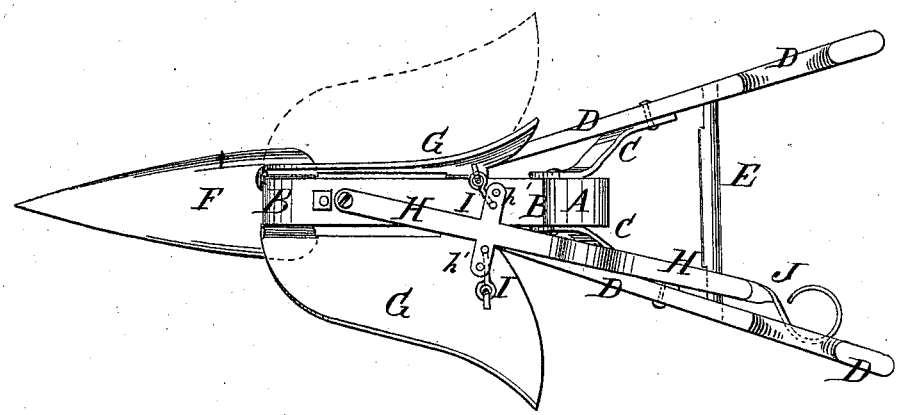

UNITED STATES PATENT OFFICE.

WILLIAM I. GOSSETT AND JAMES P. STARK, OF LIBERTY, TENNESSEE.

IMPROVEMENT IN PLOWS.

Specification forming part of Letters Patent No. 177,503, dated May 16, 1876; application filed March 6, 1876.

*To all whom it may concern:*

Be it known that we, WILLIAM I. GOSSETT and JAMES P. STARK, of Liberty, in the county of De Kalb and State of Tennessee, have invented a new and useful Improvement in Plows, of which the following is a specification:

Figure 1 is a side view of one of our improved plows. Fig. 2 is a rear view of the same.

Similar letters of reference indicate corresponding parts.

The object of this invention is to improve the construction of bull-tongue plows, and other similar plows, to adapt them for use as turn-plows in gravelly land and upon hillsides.

The invention consists in the combination of the hinged mold-boards and the pivoted lever with the standard, the plow, and the round of the handles, as hereinafter fully described.

A is the beam, to the rear end of which is attached the standard B. The upper end of the standard B is connected by braces C to the handles D, the lower ends of which are secured to the opposite sides of the beam A. The upper parts of the handles D are connected by a round, E. To the lower end of the standard B is attached a bull-tongue plow, F, a shovel-plow, or a plow of similar construction. G are two mold-boards, the forward edges of which are hinged to the forward edges of the sides of the standard B, and their lower ends project below the wings of the plow F. H is a lever, the lower end of which is pivoted to the rear side of the lower part of the standard B. Upon the sides of the lower part of the lever H are formed two lugs, $h'$, which have one or more holes formed in them to receive the links or rods I, by which the said ears are connected with the mold-boards G. The upper end of the lever H projects across the rear side of the round E, and to said lever is attached a spring, J, which projects across the forward side of round E, and has a handle formed upon its upper end.

By this construction, by moving the lever H either mold-board may be projected, as may be required. In the forward side of the end parts of the round E are formed notches to receive the spring J, to hold the mold-boards G in any position into which they may be adjusted.

Having thus described our invention, we claim as new and desire to secure by Letters Patent—

The combination of the hinged mold-boards G and the pivoted lever H J with the standard B, the plow F, and the round E of the handles D, substantially as herein shown and described.

WILLIAM I. GOSSETT.
JAMES P. STARK.

Witnesses:
ANDY I. REIRREY,
JOHN W. WHALEY.